US010053015B2

United States Patent
Peterson et al.

(10) Patent No.: US 10,053,015 B2
(45) Date of Patent: Aug. 21, 2018

(54) EXTERIOR REARVIEW MIRROR ASSEMBLY FOR VEHICLE

(71) Applicant: MAGNA MIRRORS OF AMERICA, INC., Holland, MI (US)

(72) Inventors: Kenneth C. Peterson, Ada, MI (US); Gregory A. Huizen, Hudsonville, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 0 days.

(21) Appl. No.: 15/619,629

(22) Filed: Jun. 12, 2017

(65) Prior Publication Data

US 2017/0282806 A1     Oct. 5, 2017

Related U.S. Application Data

(63) Continuation of application No. 15/142,194, filed on Apr. 29, 2016, now Pat. No. 9,676,336, which is a continuation-in-part of application No. 14/312,056, filed on Jun. 23, 2014, now Pat. No. 9,487,142.

(60) Provisional application No. 62/197,871, filed on Jul. 28, 2015, provisional application No. 62/158,141, filed on May 7, 2015, provisional application No.
(Continued)

(51) Int. Cl.
| | |
|---|---|
| *B60R 1/12* | (2006.01) |
| *B60R 1/072* | (2006.01) |
| *B60R 1/08* | (2006.01) |
| *B60R 1/074* | (2006.01) |
| *G06K 9/00* | (2006.01) |
| *H04N 5/225* | (2006.01) |

(Continued)

(52) U.S. Cl.
CPC ............... *B60R 1/12* (2013.01); *B60R 1/002* (2013.01); *B60R 1/0617* (2013.01); *B60R 1/072* (2013.01); *B60R 1/074* (2013.01); *B60R 1/082* (2013.01); *G06K 9/00805* (2013.01); *H04N 5/2257* (2013.01); *B60R 2001/1215* (2013.01); *B60R 2001/1253* (2013.01)

(58) Field of Classification Search
CPC ....... B60R 1/002; B60R 1/0617; B60R 1/072; B60R 1/074; B60R 2001/1215; B60R 2001/1223; B60R 2001/1253; B60R 1/12; H04N 5/2257
USPC .......................................... 359/841; 348/148
See application file for complete search history.

(56) References Cited

U.S. PATENT DOCUMENTS

| | | |
|---|---|---|
| 3,837,129 A | 9/1974 | Losell |
| 4,202,603 A | 5/1980 | Miyauchi |
| (Continued) | | |

*Primary Examiner* — Ricky D Shafer
(74) *Attorney, Agent, or Firm* — Honigman Miller Schwartz and Cohn, LLP

(57) ABSTRACT

An exterior rearview mirror assembly for a vehicle includes a mirror head and a mounting base, with a camera module disposed at the mirror head. The camera module includes a camera having a field of view exterior of the vehicle when the mirror assembly is attached at the vehicle. The camera module is extendable and retractable relative to a mirror casing of the mirror head. With the camera module retracted and with the mirror assembly attached at the vehicle, the camera module is oriented such that its field of view encompasses a blind spot region at least at the body side of the vehicle. With the camera module extended and with the mirror assembly attached at the vehicle, the camera module may be oriented such that its field of view encompasses a region at least along a body side of a trailer being towed by the vehicle.

23 Claims, 13 Drawing Sheets

Related U.S. Application Data

62/155,710, filed on May 1, 2015, provisional application No. 61/875,349, filed on Sep. 9, 2013, provisional application No. 61/839,110, filed on Jun. 25, 2013.

(51) Int. Cl.
*B60R 1/00* (2006.01)
*B60R 1/06* (2006.01)

(56) References Cited

U.S. PATENT DOCUMENTS

| | | |
|---|---|---|
| 4,341,444 A | 7/1982 | Stelma |
| 4,572,626 A | 2/1986 | Suzuki |
| 4,693,571 A | 9/1987 | Kimura et al. |
| 4,699,024 A | 10/1987 | Lida et al. |
| 4,826,289 A | 5/1989 | Vandenbrink et al. |
| 4,832,477 A | 5/1989 | Torii et al. |
| 4,902,108 A | 2/1990 | Byker |
| 5,005,797 A | 4/1991 | Maekawa et al. |
| 5,052,163 A | 10/1991 | Czekala |
| 5,066,112 A | 11/1991 | Lynam et al. |
| 5,069,535 A | 12/1991 | Baucke et al. |
| 5,158,638 A | 10/1992 | Osanami et al. |
| 5,190,499 A | 3/1993 | Mori et al. |
| 5,210,651 A | 5/1993 | Shibuya et al. |
| 5,327,288 A | 7/1994 | Wellington et al. |
| 5,371,659 A | 12/1994 | Pastrick et al. |
| 5,379,146 A | 1/1995 | Defendini |
| 5,421,940 A | 6/1995 | Cornils et al. |
| 5,467,230 A | 11/1995 | Boddy et al. |
| 5,489,080 A | 2/1996 | Allen |
| 5,497,306 A | 3/1996 | Pastrick |
| 5,513,048 A | 4/1996 | Chen |
| 5,525,264 A | 6/1996 | Cronin et al. |
| 5,530,240 A | 6/1996 | Larson et al. |
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,575,552 A | 11/1996 | Faloon et al. |
| 5,579,178 A | 11/1996 | Mochizuki |
| 5,582,383 A | 12/1996 | Mertens et al. |
| 5,642,238 A * | 6/1997 | Sala .............. B60Q 1/0023 348/148 |
| 5,649,756 A | 7/1997 | Adams et al. |
| 5,669,698 A | 9/1997 | Veldman et al. |
| 5,669,699 A | 9/1997 | Pastrick et al. |
| 5,680,263 A | 10/1997 | Zimmermann et al. |
| 5,684,646 A | 11/1997 | Boddy |
| 5,701,211 A | 12/1997 | Perry et al. |
| 5,703,731 A | 12/1997 | Boddy et al. |
| 5,790,298 A | 8/1998 | Tonar |
| 5,796,176 A | 8/1998 | Kramer et al. |
| 5,818,625 A | 10/1998 | Forgette et al. |
| 5,823,054 A | 10/1998 | Brouwer |
| 5,823,654 A | 10/1998 | Pastrick et al. |
| 5,900,999 A | 5/1999 | Huizenga et al. |
| 5,903,402 A | 5/1999 | Hoek |
| 5,949,591 A | 9/1999 | Whitehead |
| 5,984,482 A | 11/1999 | Rumsey et al. |
| 6,023,229 A | 2/2000 | Bugno |
| 6,064,508 A | 5/2000 | Forgette et al. |
| 6,068,380 A | 5/2000 | Lynn et al. |
| 6,102,546 A | 8/2000 | Carter |
| 6,116,743 A | 9/2000 | Hoek |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,213,609 B1 | 4/2001 | Foote et al. |
| 6,213,612 B1 | 4/2001 | Schnell et al. |
| 6,227,675 B1 | 5/2001 | Mertens et al. |
| 6,227,689 B1 | 5/2001 | Miller |
| 6,229,226 B1 | 5/2001 | Kramer et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,808 B1 | 8/2001 | Foote et al. |
| 6,276,821 B1 | 8/2001 | Pastrick et al. |
| 6,312,135 B1 | 11/2001 | Polzer |
| 6,315,419 B1 | 11/2001 | Platzer |
| 6,325,518 B1 | 12/2001 | Whitehead et al. |
| 6,329,925 B1 | 12/2001 | Skiver et al. |
| 6,333,759 B1 | 12/2001 | Mazzilli |
| 6,369,804 B1 | 4/2002 | Sandbach |
| 6,407,468 B1 | 6/2002 | LeVesque et al. |
| 6,407,847 B1 | 6/2002 | Poll et al. |
| 6,439,730 B1 | 8/2002 | Foote et al. |
| 6,439,755 B1 | 8/2002 | Fant, Jr. et al. |
| 6,447,128 B1 * | 9/2002 | Lang .............. B60R 1/00 359/871 |
| 6,452,479 B1 | 9/2002 | Sandbach |
| 6,467,920 B2 | 10/2002 | Schnell et al. |
| 6,497,491 B2 | 12/2002 | Boddy et al. |
| 6,499,850 B2 | 12/2002 | Waldmann |
| 6,502,970 B1 | 1/2003 | Anderson et al. |
| 6,520,690 B2 | 2/2003 | Chu |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,642,840 B2 * | 11/2003 | Lang .............. B60R 1/00 340/425.5 |
| 6,650,457 B2 | 11/2003 | Busscher et al. |
| 6,690,268 B2 | 2/2004 | Schofield et al. |
| 6,698,905 B1 | 3/2004 | Whitehead |
| 6,755,543 B1 | 6/2004 | Foote et al. |
| 6,795,111 B1 | 9/2004 | Mazzilli |
| 6,916,100 B2 | 7/2005 | Pavao |
| 6,954,152 B1 | 10/2005 | Matthews |
| 6,961,195 B2 | 11/2005 | Inagaki |
| 6,981,774 B2 | 1/2006 | Dumont et al. |
| 7,012,729 B2 | 3/2006 | Tonazzi et al. |
| 7,080,914 B1 | 7/2006 | Boddy |
| 7,093,946 B2 | 8/2006 | Barve et al. |
| 7,093,965 B2 | 8/2006 | Veldman |
| 7,097,312 B2 | 8/2006 | Platzer |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,175,321 B1 | 2/2007 | Lopez |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,267,449 B1 | 9/2007 | Boddy et al. |
| 7,314,285 B2 | 1/2008 | Ruse et al. |
| 7,350,931 B1 | 4/2008 | Peterson et al. |
| 7,360,932 B2 | 4/2008 | Uken |
| 7,370,983 B2 | 5/2008 | De Wind et al. |
| 7,510,311 B2 | 3/2009 | Romas et al. |
| 7,532,149 B2 | 5/2009 | Banko et al. |
| 7,581,859 B2 | 9/2009 | Lynam |
| 7,626,749 B2 | 12/2009 | Baur et al. |
| 7,690,800 B2 | 4/2010 | Fukai et al. |
| 7,722,199 B2 | 5/2010 | DeWard et al. |
| 7,817,020 B2 | 10/2010 | Turnbull et al. |
| 7,883,224 B2 | 2/2011 | Onuki |
| 7,926,960 B2 | 4/2011 | Skiver et al. |
| 7,944,371 B2 | 5/2011 | Foote et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,179,586 B2 | 5/2012 | Schofield et al. |
| 8,194,133 B2 | 6/2012 | DeWind et al. |
| 8,237,909 B2 | 8/2012 | Ostreko et al. |

(56) References Cited

U.S. PATENT DOCUMENTS

| | | |
|---|---|---|
| 8,339,526 B2 | 12/2012 | Minikey, Jr. et al. |
| 8,366,285 B2 | 2/2013 | Reedman et al. |
| 8,465,161 B2 | 6/2013 | De Wind et al. |
| 8,508,831 B2 | 8/2013 | De Wind et al. |
| 8,730,553 B2 | 5/2014 | De Wind et al. |
| 8,764,256 B2 | 7/2014 | Foote et al. |
| 8,786,704 B2 | 7/2014 | Foote et al. |
| 8,915,601 B2 | 12/2014 | Foote et al. |
| 9,057,833 B2 | 6/2015 | Bowers |
| 9,067,541 B2 | 6/2015 | Sobecki et al. |
| 9,487,142 B2 | 11/2016 | Sobecki et al. |
| 9,676,336 B2 | 6/2017 | Peterson et al. |
| 2002/0063978 A1 | 5/2002 | Guttenberger et al. |
| 2002/0080016 A1 | 6/2002 | Keirstead |
| 2003/0103142 A1* | 6/2003 | Hitomi ................ B60R 1/074 348/148 |
| 2003/0202097 A1 | 10/2003 | Kallhammer |
| 2003/0210328 A1 | 11/2003 | Mazzilli |
| 2004/0061931 A1* | 4/2004 | Kallhammer ............ B60R 1/00 359/362 |
| 2005/0099710 A1 | 5/2005 | Ro |
| 2005/0128612 A1 | 6/2005 | Ro |
| 2005/0140785 A1 | 6/2005 | Mazzilli |
| 2005/0281043 A1 | 12/2005 | Eisenbraun |
| 2006/0050018 A1 | 3/2006 | Hutzel et al. |
| 2006/0061008 A1 | 3/2006 | Karner et al. |
| 2006/0250224 A1 | 11/2006 | Steffel et al. |
| 2007/0002477 A1 | 1/2007 | Whitehead |
| 2007/0023611 A1* | 2/2007 | Saccagno ................ B60R 1/12 250/208.1 |
| 2007/0139751 A1 | 6/2007 | Kuiper et al. |
| 2007/0285812 A1 | 12/2007 | Foote et al. |
| 2008/0055411 A1* | 3/2008 | Lee ........................ B60R 1/00 348/148 |
| 2008/0100939 A1 | 5/2008 | Brester |
| 2008/0304705 A1 | 12/2008 | Pomerleau |
| 2009/0040306 A1 | 2/2009 | Foote et al. |
| 2009/0243824 A1 | 10/2009 | Peterson et al. |
| 2010/0079883 A1* | 4/2010 | Englander ............ B60R 1/083 359/877 |
| 2010/0171830 A1 | 7/2010 | Lee |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0081915 A1 | 4/2012 | Foote et al. |
| 2012/0236388 A1 | 9/2012 | De Wind et al. |
| 2013/0107386 A1 | 5/2013 | Sobecki et al. |
| 2014/0063245 A1 | 3/2014 | Bowers |
| 2014/0133044 A1 | 5/2014 | Mambourg et al. |
| 2014/0376119 A1 | 12/2014 | Sobecki et al. |
| 2015/0097955 A1 | 4/2015 | De Wind et al. |
| 2015/0353018 A1 | 12/2015 | Sobecki et al. |
| 2015/0360615 A1 | 12/2015 | Peterson et al. |

* cited by examiner

Retracted Position (Blind Zone)

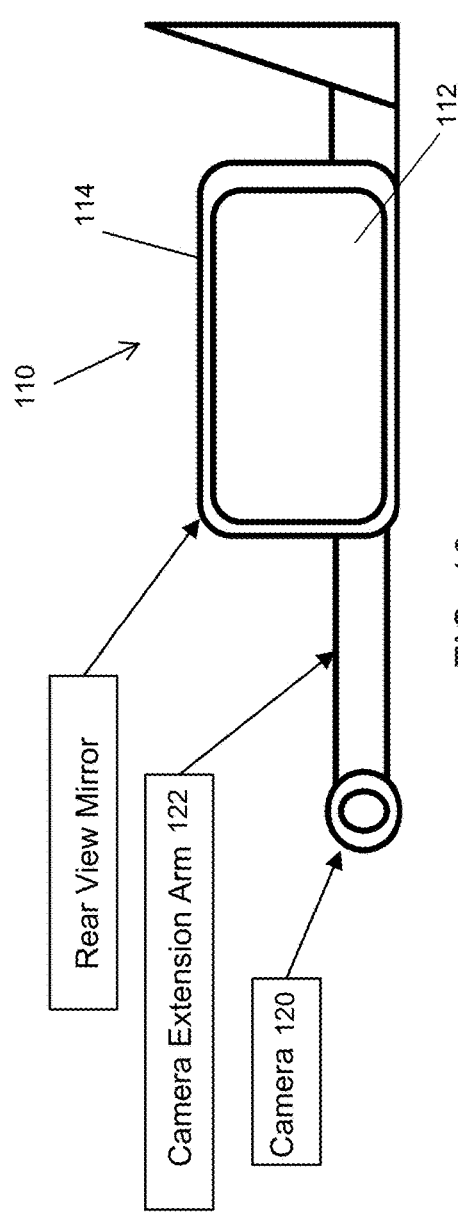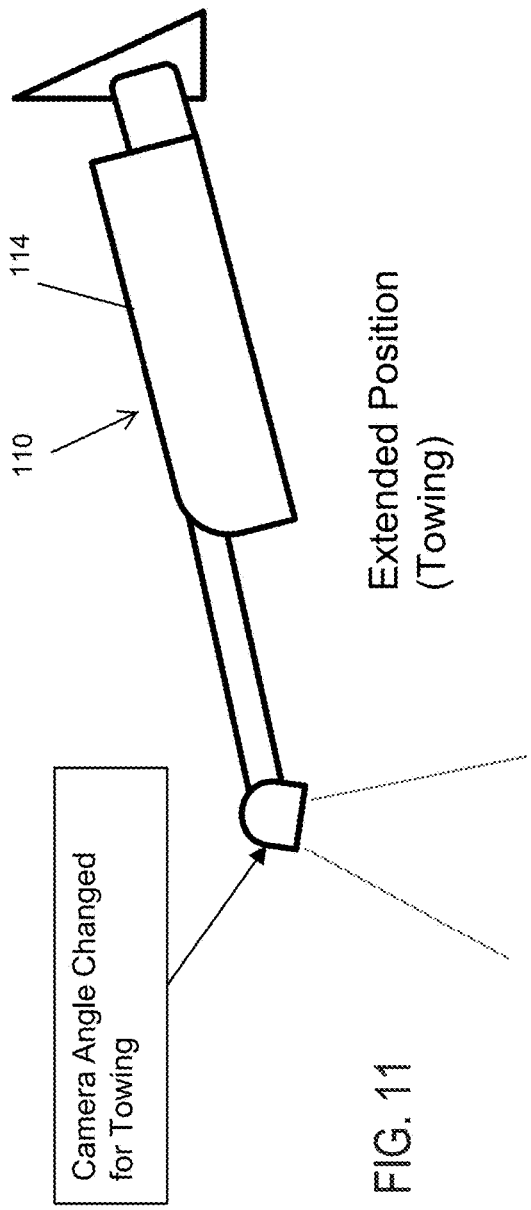

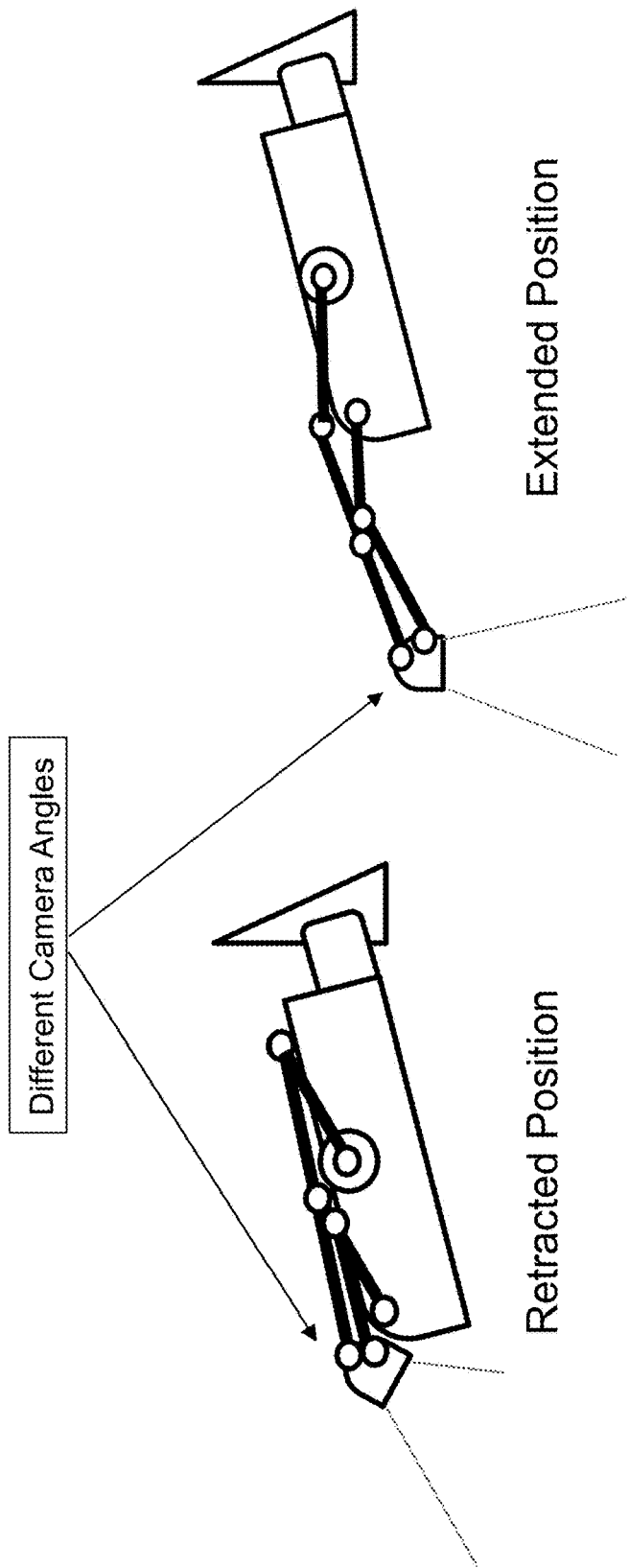

EXTERIOR REARVIEW MIRROR ASSEMBLY FOR VEHICLE

CROSS REFERENCE TO RELATED APPLICATIONS

The present application is a continuation of U.S. patent application Ser. No. 15/142,194, filed Apr. 29, 2016, now U.S. Pat. No. 9,676,336, which claims the filing benefits of U.S. provisional applications, Ser. No. 62/197,871, filed Jul. 28, 2015; Ser. No. 62/158,141, filed May 7, 2015, and Ser. No. 62/155,710, filed May 1, 2015, which are hereby incorporated herein by reference in their entireties. U.S. patent application Ser. No. 15/142,194 is also a continuation-in-part of U.S. patent application Ser. No. 14/312,056, filed Jun. 23, 2014, now U.S. Pat. No. 9,487,142, which claims the filing benefits of U.S. provisional applications, Ser. No. 61/875,349, filed Sep. 9, 2013 and Ser. No. 61/839,110, filed Jun. 25, 2013, which are hereby incorporated herein by reference in their entireties.

FIELD OF THE INVENTION

The present invention relates generally to the field of exterior rearview mirror assemblies for vehicles.

BACKGROUND OF THE INVENTION

It is known to provide an automotive exterior rearview mirror assembly that includes one or more accessories, such as a light source and/or a camera or the like. The exterior mirror assembly may include visual indicators such as turn signal indicators and blind zone indicators that indicate to a driver presence of another overtaking vehicle in a side lane adjacent to the equipped vehicle. The exterior rearview mirror may comprise a foldable mirror assembly, such as a powerfold mirror where the mirror head is pivotable between a drive or use position and a folded or park position via an actuator.

SUMMARY OF THE INVENTION

The present invention provides an exterior rearview mirror assembly that includes a camera, such as a camera having a generally rearward and/or sideward field of view at the side of the vehicle at which the exterior rearview mirror assembly is mounted. The camera is extendable and pivotable to provide an enhanced rearward field of view, such as in response to a user input or other triggering event. The camera is pivoted about a generally vertical pivot axis to adjust an orientation of the camera, such that the camera, when retracted, has a generally outboard field of view away from the side of the vehicle, and when extended, has a generally rearward field of view along the side of the vehicle. The camera is extendable and retractable via a mechanism that extends and retracts the camera while also correspondingly rotating the camera about its generally vertical pivot axis.

The present invention thus provides a camera that, when retracted, has a field of view that encompasses a blind spot region of the vehicle and, when extended, extends outboard of a width of a trailer towed by the vehicle and has a field of view that encompasses the region along the side of the trailer. The present invention thus provides a camera that has enhanced viewing rearward and sideward of the vehicle, particularly when the vehicle is towing a trailer that may be wider than the width of the vehicle itself.

These and other objects, advantages, purposes and features of the present invention will become apparent upon review of the following specification in conjunction with the drawings.

BRIEF DESCRIPTION OF THE DRAWINGS

FIG. 10 is a forward viewing elevation of the exterior rearview mirror assembly of FIG. 8, with the camera extended;

FIG. 11 is a top plan view of the exterior rearview mirror assembly of FIG. 9, with the camera extended;

FIG. 15 is a schematic showing the mirror assembly and camera and positioning links of FIG. 14, shown with the camera retracted;

FIG. 16 is another schematic showing the mirror assembly and camera and positioning links of FIG. 14, shown with the camera extended;

DESCRIPTION OF THE PREFERRED EMBODIMENTS

Figure 1:
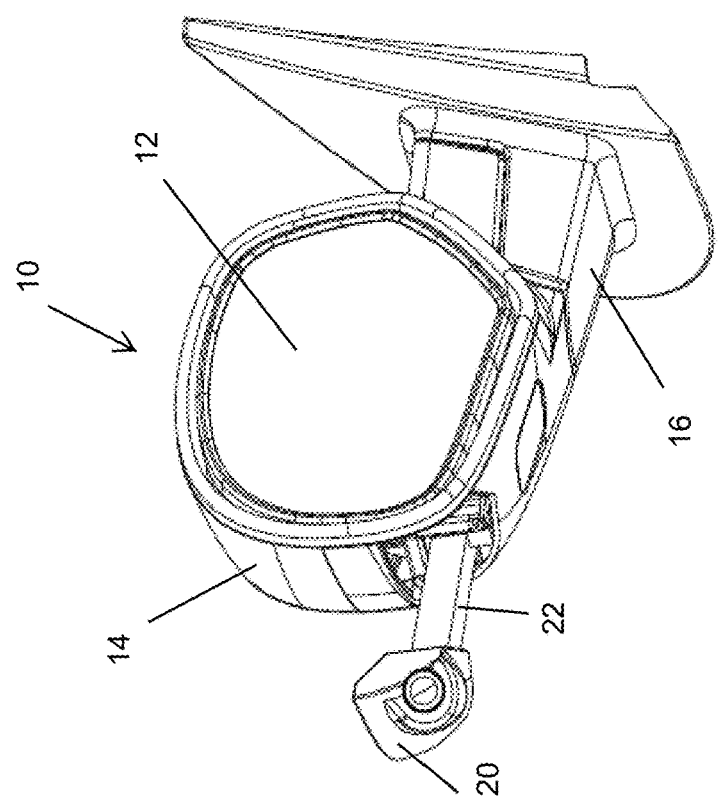
FIG. 1 is a perspective view of another exterior rearview mirror assembly of the present invention, having a camera disposed thereat.
Figure 2:
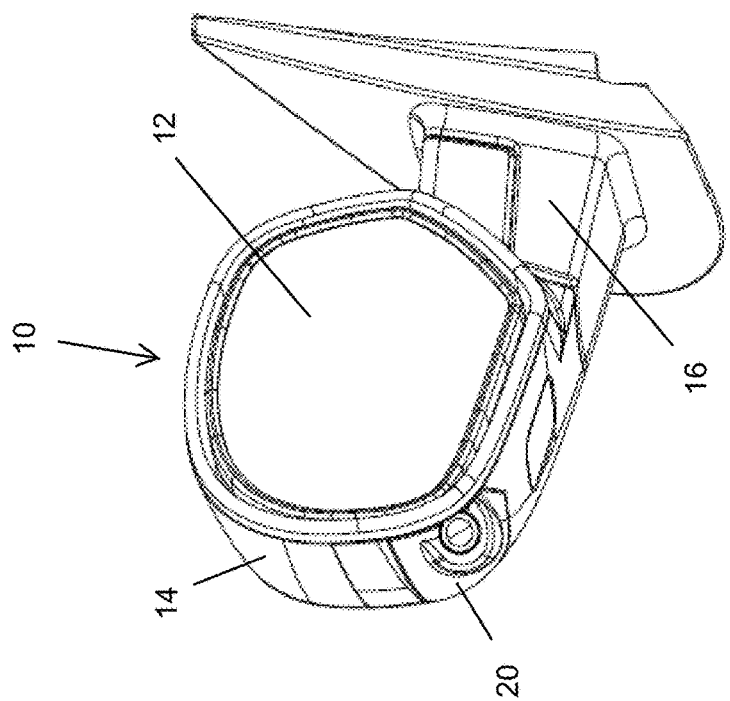
FIG. 2 is another perspective view of the exterior rearview mirror assembly of FIG. 1, shown with the camera extended laterally outward from the mirror head in accordance with the present invention.
Figure 3:
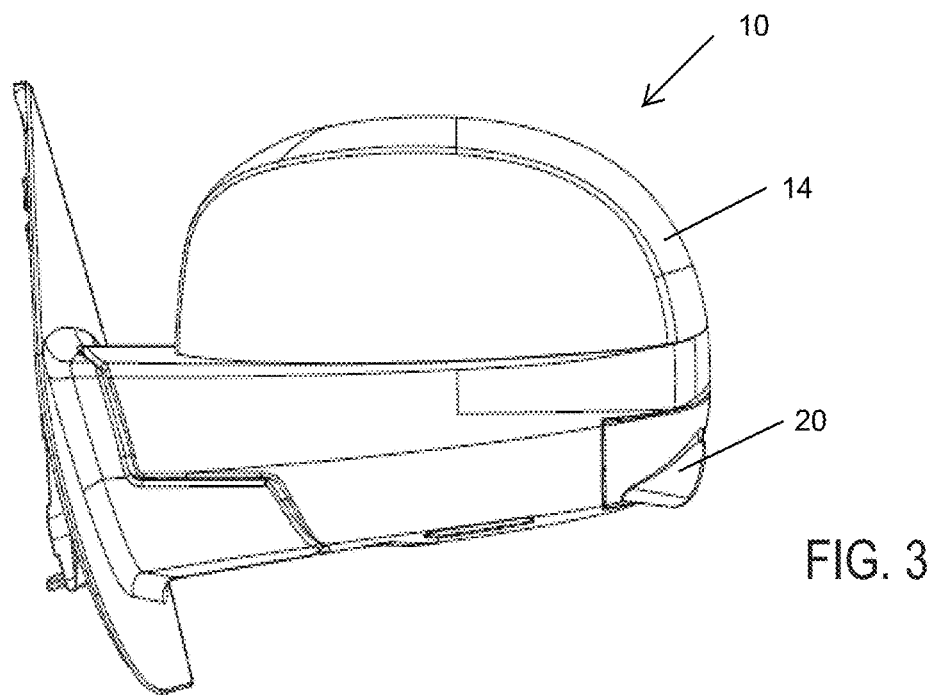
FIG. 3 is a rearward viewing elevation of the exterior rearview mirror assembly of FIG. 1.
Figure 4:
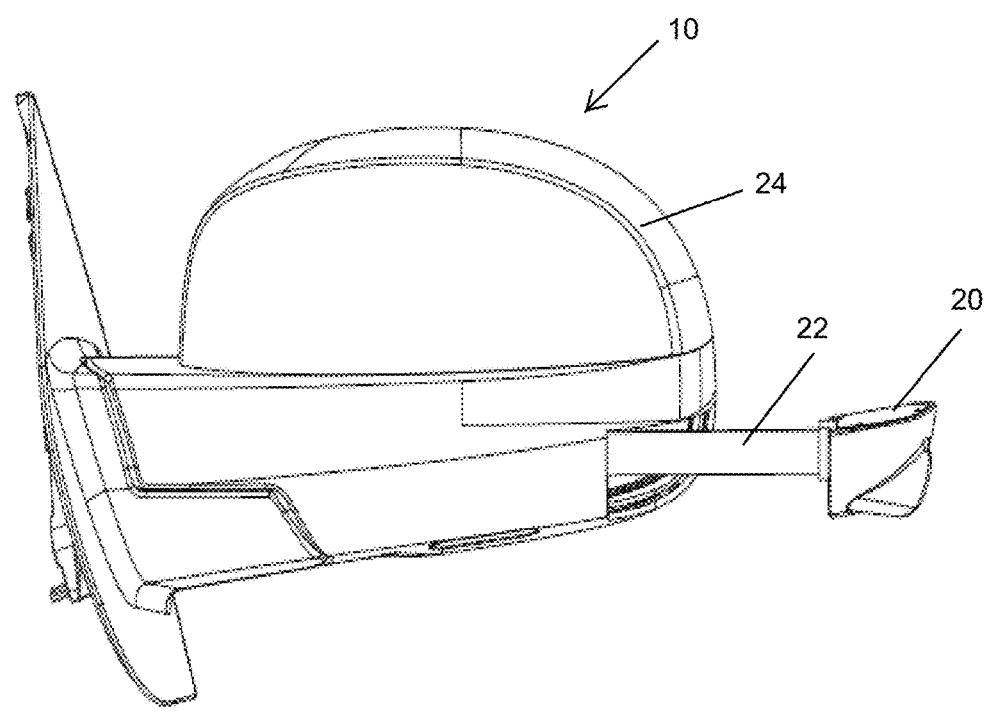
FIG. 4 is a rearward viewing elevation of the exterior rearview mirror assembly of FIG. 2.
Figure 5:
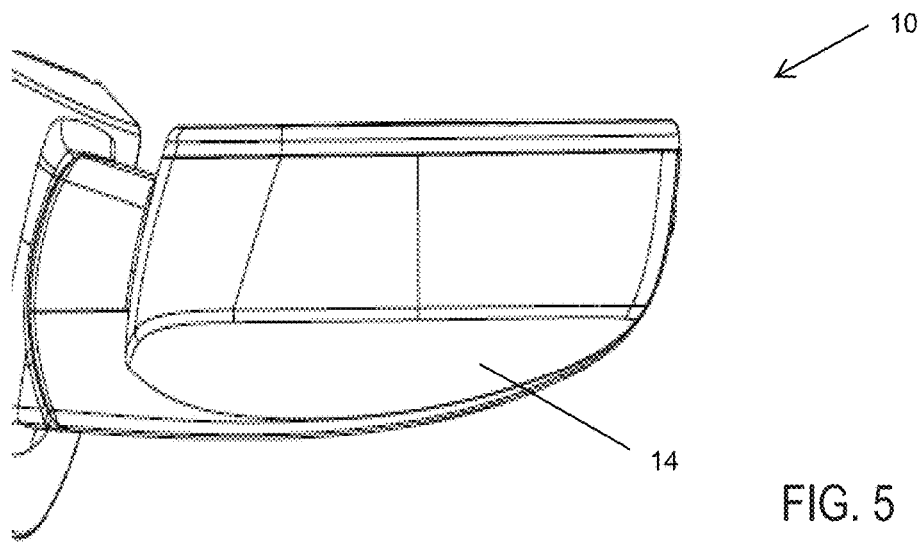
FIG. 5 is a top plan view of the exterior rearview mirror assembly of FIG. 1.
Figure 6:
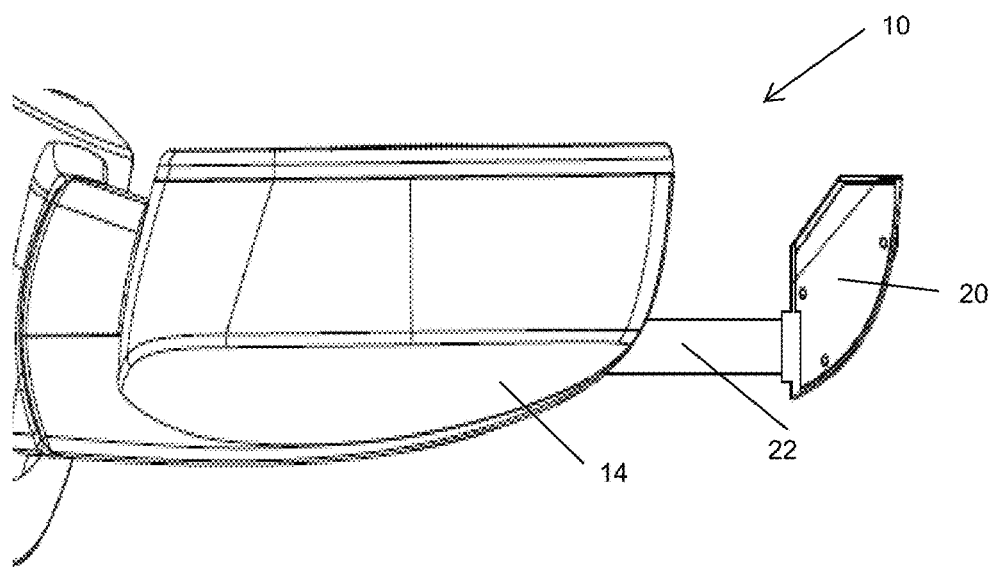
FIG. 6 is a top plan view of the exterior rearview mirror assembly of FIG. 2.
Figure 7:
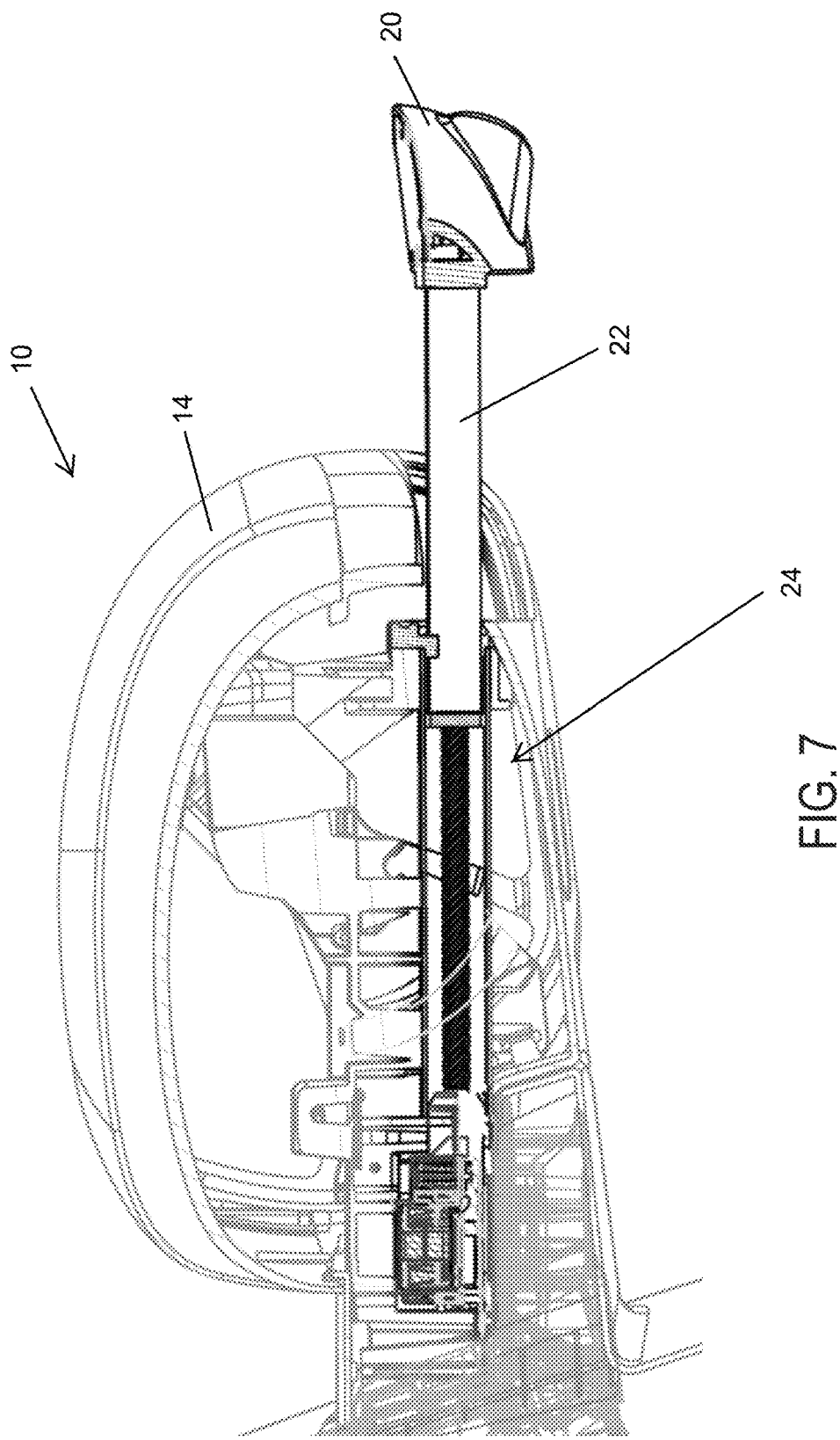
FIG. 7 is a rearward viewing elevation and partial sectional view of the exterior rearview mirror assembly of FIG. 2.
Figure 8:
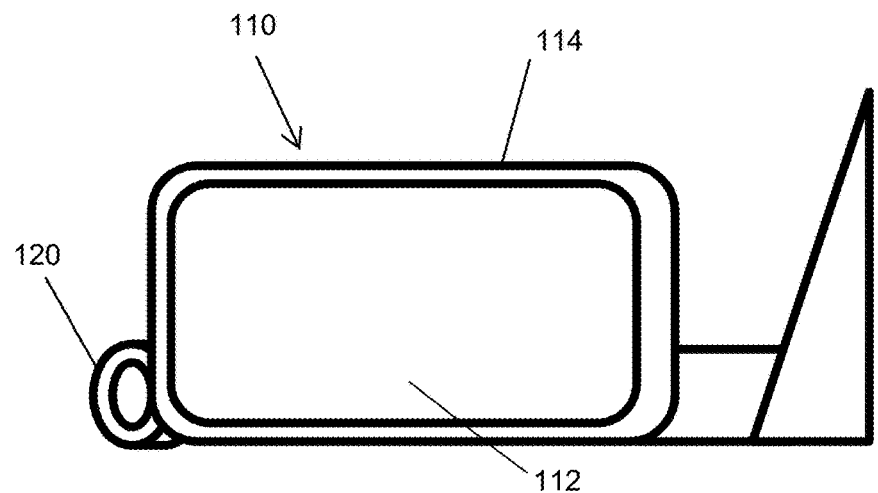
FIG. 8 is a forward viewing elevation of another exterior rearview mirror assembly of the present invention.
Figure 9:
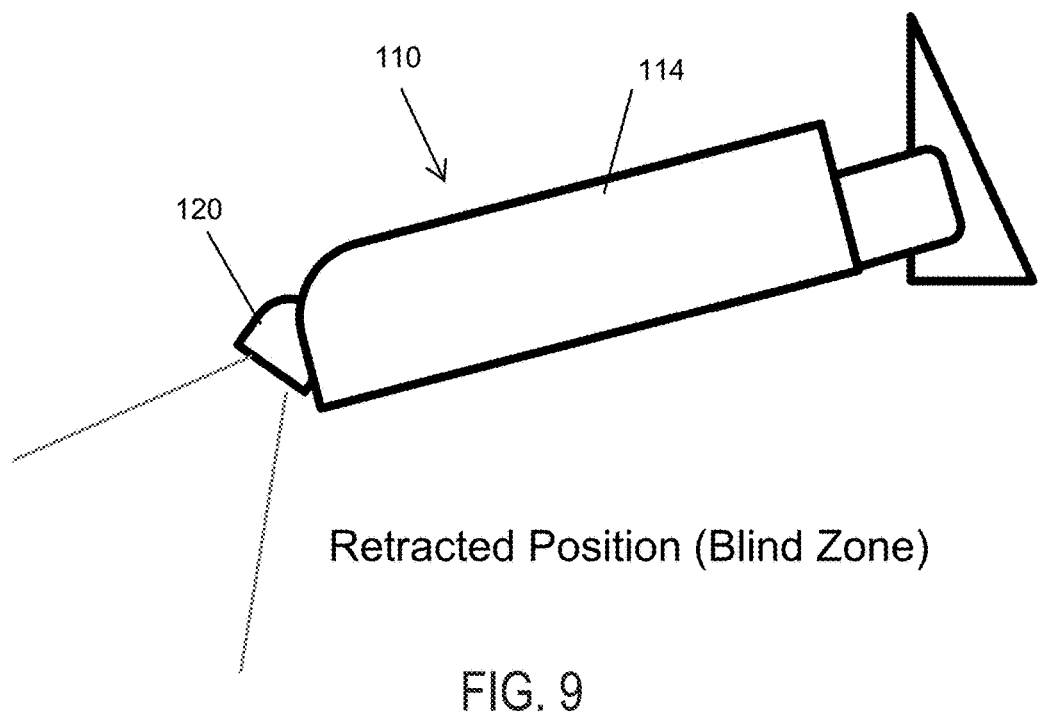
FIG. 9 is a top plan view of the exterior rearview mirror assembly of FIG. 8.
Figure 12:
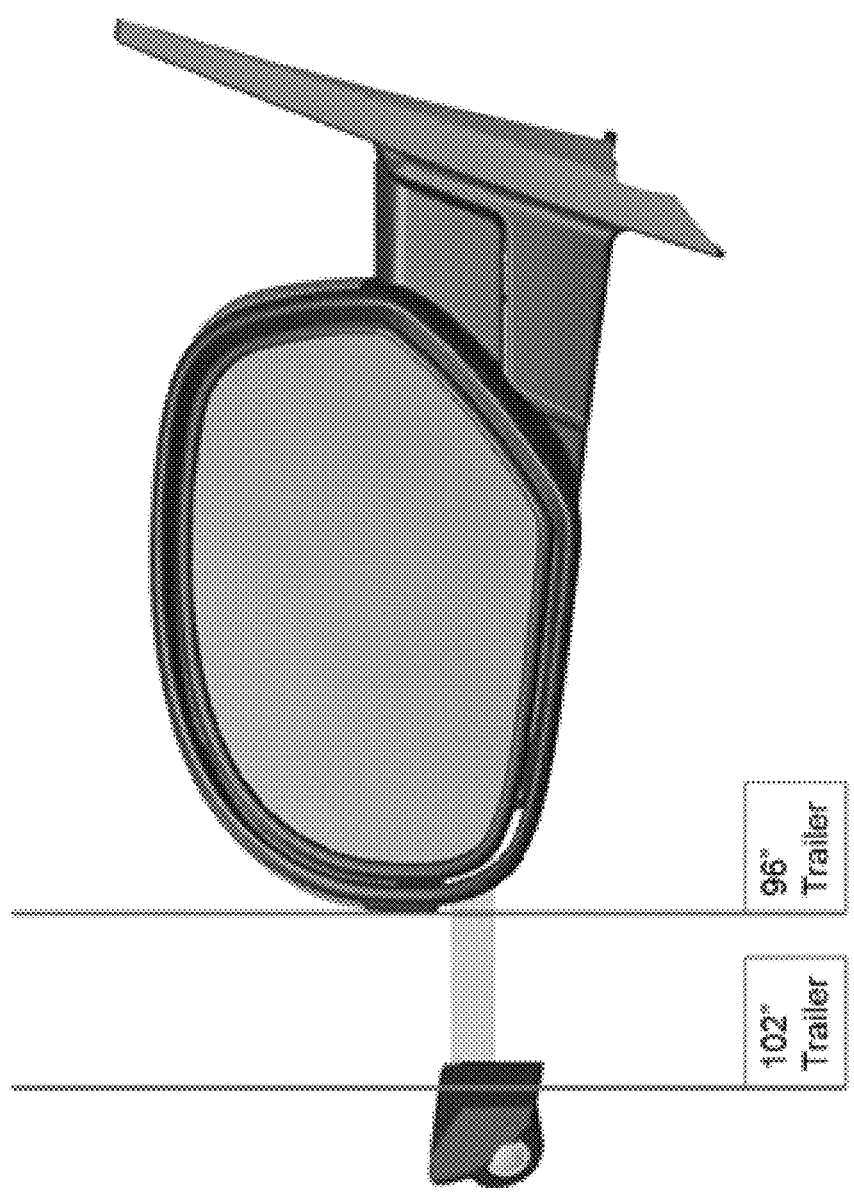
FIG. 12 is a forward viewing elevation of an exterior rearview mirror assembly of the present invention, with the camera extended, showing that the camera may be positioned at different locations depending on the width of the trailer being towed by the vehicle.

Referring now to the drawings and the illustrative embodiments depicted therein, an exterior rearview mirror assembly 10 for a vehicle includes a mirror reflective element (12, 112) received in and/or supported at or by a mirror shell or casing or head portion (14, 114). The mirror casing or head portion 14 may be fixedly attached at a mounting arm or base 16 at the side of the vehicle or may be movably mounted to a mounting arm or base or portion 16, and may comprise a breakaway mirror (where the mirror head portion may be manually pivoted about the mounting arm or base) or may comprise a powerfold mirror (where the mirror head portion may be pivoted via an actuator assembly or adjustment device). Mounting arm or base 16 of mirror assembly 10 is mounted at the side of a host or subject vehicle, with the reflective element 12 providing a rearward field of view along the respective side of the vehicle to the driver of the vehicle. The exterior rearview mirror assembly includes an imaging sensor or camera module 20 (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like. The camera module 20 is adjustably mounted at the mirror assembly and is adjustable between a retracted position (FIGS. 1, 3 and 5) and an extended position (FIGS. 2, 4, 6 and 7) to provide an adjustable and enhanced rearward field of view of the camera, as discussed below. The mirror assembly and camera module may utilize aspects of the mirror assemblies and camera modules described in U.S. Publication No. US-2014-0376119, which is hereby incorporated herein by reference in its entirety.

The camera mirror assembly of the present invention provides reduced wind drag and limits the need for foldaway mirrors on a vehicle. Optionally, and desirably, the camera mirror assembly of the present invention may be utilized on a type of vehicle that would be used for towing a trailer. Special towing mirrors are usually needed for such cases because the trailer is often wider than the towing vehicle and the driver needs to be able to see around the trailer.

In order to provide the required field of view around a trailer that is towed by the vehicle, the camera may have an alternate mounting position that brings the camera lens outside the width of the trailer. This may be accomplished by an interchangeable camera mount, or by providing an extendable or telescoping mount or arm 22 in the mirror housing that allows for movement of the camera to a trailer towing position (FIGS. 2, 4, 6 and 7).

In the case of an interchangeable camera mount, the camera may be mounted in a normal driving position on the mirror housing when the vehicle is not towing a trailer. To prepare the vehicle for towing, the camera can be re-mounted on the mirror housing using an alternative camera mounting apparatus, or a separate camera with such an extended mounting apparatus may be substituted for the standard camera.

In applications where sufficient space is available in the design, a camera extension mechanism 24 (FIG. 7) may be employed that allows the camera to be moved from the normal inboard position to the towing position without changing the mounting apparatus. The camera movement may be accomplished manually, or may be powered by a motor and drive mechanism. Such a mechanism may be similar to that used to extend known towing mirrors. However, because the camera is smaller and lighter than a typical towing mirror, the extension mechanism can be potentially be made lighter and cost less.

The camera extension mechanism may operate to not only extend the position of the camera outboard, but also to rotate the camera for an enhanced or optimal field of view. For example, when the camera is retracted, such as when the vehicle is not towing a trailer, the camera angle can be rotated outboard to cover the blind zone. However, when the camera is extended for towing, the camera angle can be rotated more rearward so that the driver can see sideward along the length of the trailer. The housing of the camera (and the extension arm) preferably has an outer surface or cowling to minimize aerodynamic drag and wind noise at the mirror assembly, such as when in its retracted state or extended state.

The extension mechanism may comprise any suitable means for moving the camera between the retracted state (where the outer surface of the camera module may generally correspond with the outer surface of the mirror casing around where the camera is disposed) and the extended state. For example, the extension mechanism may comprise a telescoping arm or a rack and pinion extension mechanism or the like, such as by utilizing aspects of the systems described in U.S. Pat. No. 7,370,983 and/or 6,690,268, and/or U.S. Publication No. US-2006-0050018, which are hereby incorporated herein by reference in their entireties. Other types of drive mechanisms used to extend and retract the camera may include drive screws, rack and pinion drives, belt and pulley mechanisms, cams, pneumatic or hydraulic cylinders, or powered linkage systems, such as a linkage system utilizing aspects of the mirror assemblies described in U.S. Publication No. US-2015-0360615, which is hereby incorporated herein by reference in its entirety.

The camera may be extended and retracted responsive to a user input (such as a button or the like disposed in the vehicle) that is actuatable by the driver of the vehicle when the driver is normally operating the vehicle. For example, when the driver needs or wants to see further around the towed trailer (or other object or obstacle at or near the rear of the vehicle), the driver can actuate the user input, whereby the camera will extend laterally outwards from the mirror head and whereby a display in the vehicle will display video images captured by the camera for viewing by the driver of the vehicle while normally operating the vehicle.

When the camera is retracted (such as when the vehicle is parked or turned off or responsive to the user input or other user input or the like), the display may continue to display images captured by the camera. Optionally, the display will no longer display the captured images captured by the mirror camera when the camera is retracted.

Optionally, the camera may rotate about the longitudinal axis of the extension arm to provide an enhanced downward field of view of the camera, such as for use in bird's-eye view or surround view vision systems or the like, such as of the types discussed below. The extension and/or pivoting may be done responsive to a user input or responsive to the bird's-eye view display system operating, such as when the driver shifts the vehicle into reverse gear.

Figure 13A:
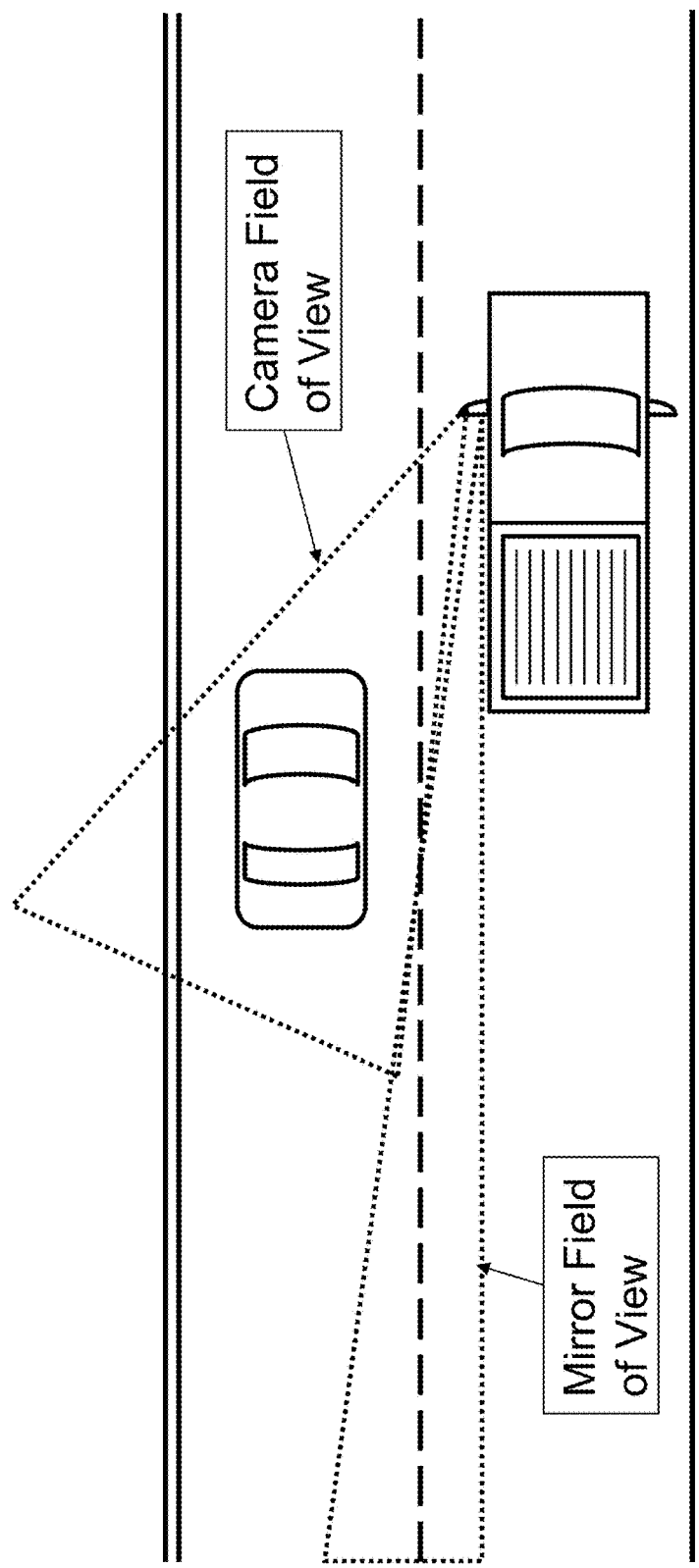
FIG. 13A is a top plan view of a vehicle equipped with the exterior rearview mirror assembly of the present invention, shown with the camera retracted.
Figure 13B:
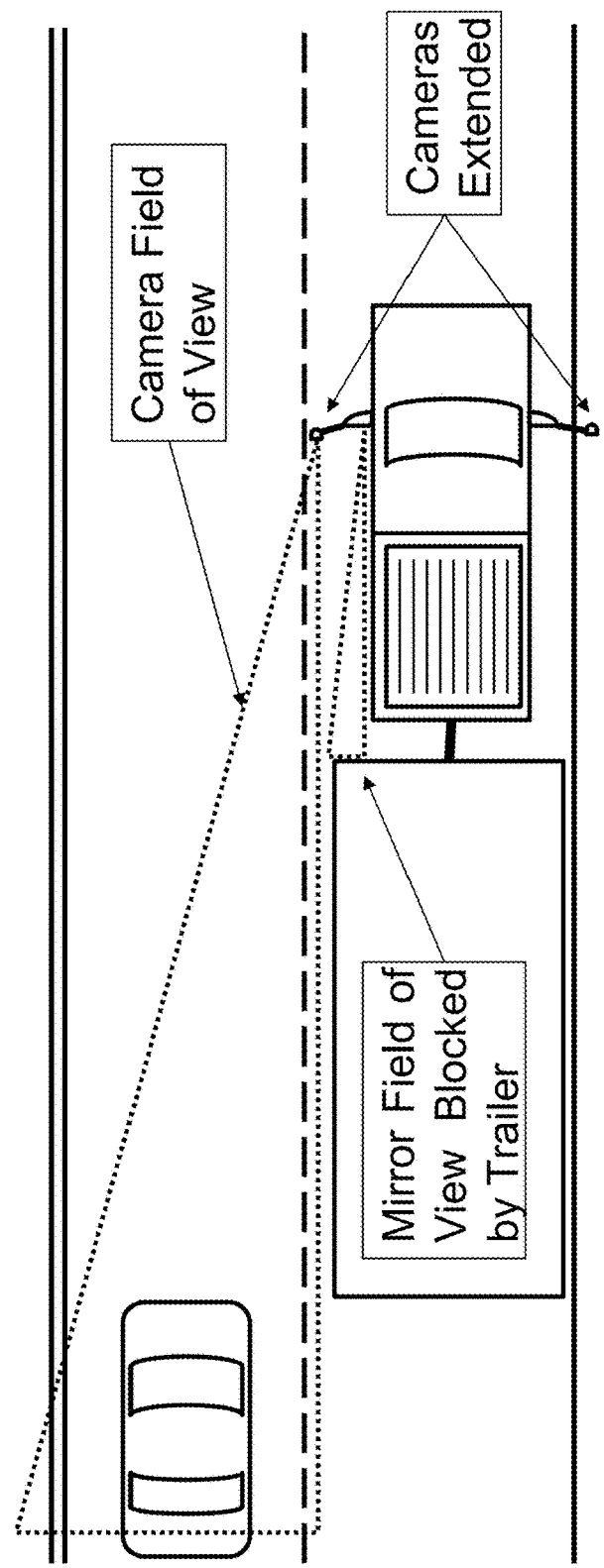
FIG. 13B is a top plan view of a vehicle equipped with the exterior rearview mirror assembly of the present invention, shown with the camera extended to enhance the rearward field of view rearward and sideward of a trailer being towed by the vehicle.

Optionally, the camera may also or otherwise rotate about a generally vertical pivot axis to adjust the field of view inboard and outboard as the camera is moved towards its extended and retracted positions. For example, and with reference to FIGS. 8-13B, the camera 120 of a mirror assembly 110 extends and retracts via an extendable/retractable arm 122, such as in a similar manner as described above. However, when camera 120 is extended, it is also pivoted or adjusted about a generally vertical pivot axis to adjust its field of view to be more inboard along the side of the vehicle. This is best seen with reference to FIGS. 13A and 13B. As shown in FIG. 13A, when the camera is retracted, the camera is oriented at the mirror assembly such that its field of view is generally outboard away from the side of the vehicle so as to encompass the blind spot region at the side and rear of the vehicle. As shown in FIG. 13B, when the camera is extended, the camera's orientation is adjusted such that the camera's field of view is more inboard along the side of the vehicle so as to encompass an area rearward of the vehicle and along the side of and rearward of a trailer being pulled by the vehicle. As also shown in FIG. 13B, the extension arm is long enough so as to position the camera (when extended) at or near or outboard of the side of the trailer so as to provide an enhanced field of view to the driver that is rearward and sideward of the trailer being towed by the vehicle.

Typically, trailer tow mirrors are designed to provide the driver a field of view such that they can see all the way down the side of the trailer being towed by the equipped vehicle. Most states in the U.S. have laws that limit the width of a trailer to 102 inches (8½ ft.). In order to properly see around a trailer, a camera in the towing position should extend beyond this width (see FIG. 12). Some states limit the trailer width on most roads to 96 inches (8 ft.) except on the interstates, and many rear-view mirrors designed for trailer towing only extend far enough to see around a 96 inch wide trailer.

Many states also limit the width of the vehicle to 108 inches, including the exterior rearview mirrors. This means that when towing a 102 inch wide trailer, the outboard regions of the exterior rearview mirrors may only extend about 3 inches beyond the width of the trailer on each side. If a flat mirror that is about 36 inches from the driver's eyes is adjusted so that the driver can see the side of the trailer, the resulting horizontal field of view provided by the mirror would be approximately 5 degrees. With binocular vision this increases to approximately 9 degrees. In order to meet or exceed the field of view provided by a flat mirror, a camera would need to have a horizontal field of view of at least 9 degrees.

To cover the entire area between the driver's peripheral vision and the side of the vehicle, the field of view of the camera may be approximately 90 degrees or more. However, an excessively large field of view results in difficulty in judging the distance to objects seen with the system. For this reason, ECE R46, used in many parts of the world, limits the magnification of a rear-view mirror to 0.31 minimum for the driver side mirror and 0.20 minimum for the passenger side mirror on Class III vehicles (typical non-commercial type), while in the U.S., FMVSS 111 states that the mirror must be flat glass with 1:1 magnification ratio.

If the goal of the mirror assembly is to limit the magnification of the system to that specified in the previously mentioned regulations, the maximum field of view allowed for the camera is determined by the width of the display, the distance between the display and the driver's eyes, and the amount of magnification allowed in the image. This may be calculated with the following formula:

$$\alpha = \frac{\tan^{-1}\left(\frac{W}{d}\right)}{M}$$

where $\alpha$ is the horizontal field of view of the camera (degrees), W is the width of the display (meters), d is the distance between the display and the driver's eyes (meters) and M is the magnification (unitless). Based on the above, the field of view of the camera should be designed to have a field of view somewhere between a minimum of 9 degrees and a maximum of 90 degrees.

When the camera is in the trailer towing position (FIG. 13B), the angle of the camera should be rotated inward toward the vehicle so that the trailer slightly occludes the field of view. When the driver can see the side of the vehicle or trailer it provides a reference to help the driver know where they are looking.

When the camera is in the retracted position (FIG. 13A), it may serve to cover the blind spots sideward and rearward of the vehicle. If the existing exterior rearview mirror provides a field of view of 13 degrees, the inboard limit of the camera field of view should be positioned so as to slightly overlap the outermost limit of the field of view provided by the mirror.

Figure 14:
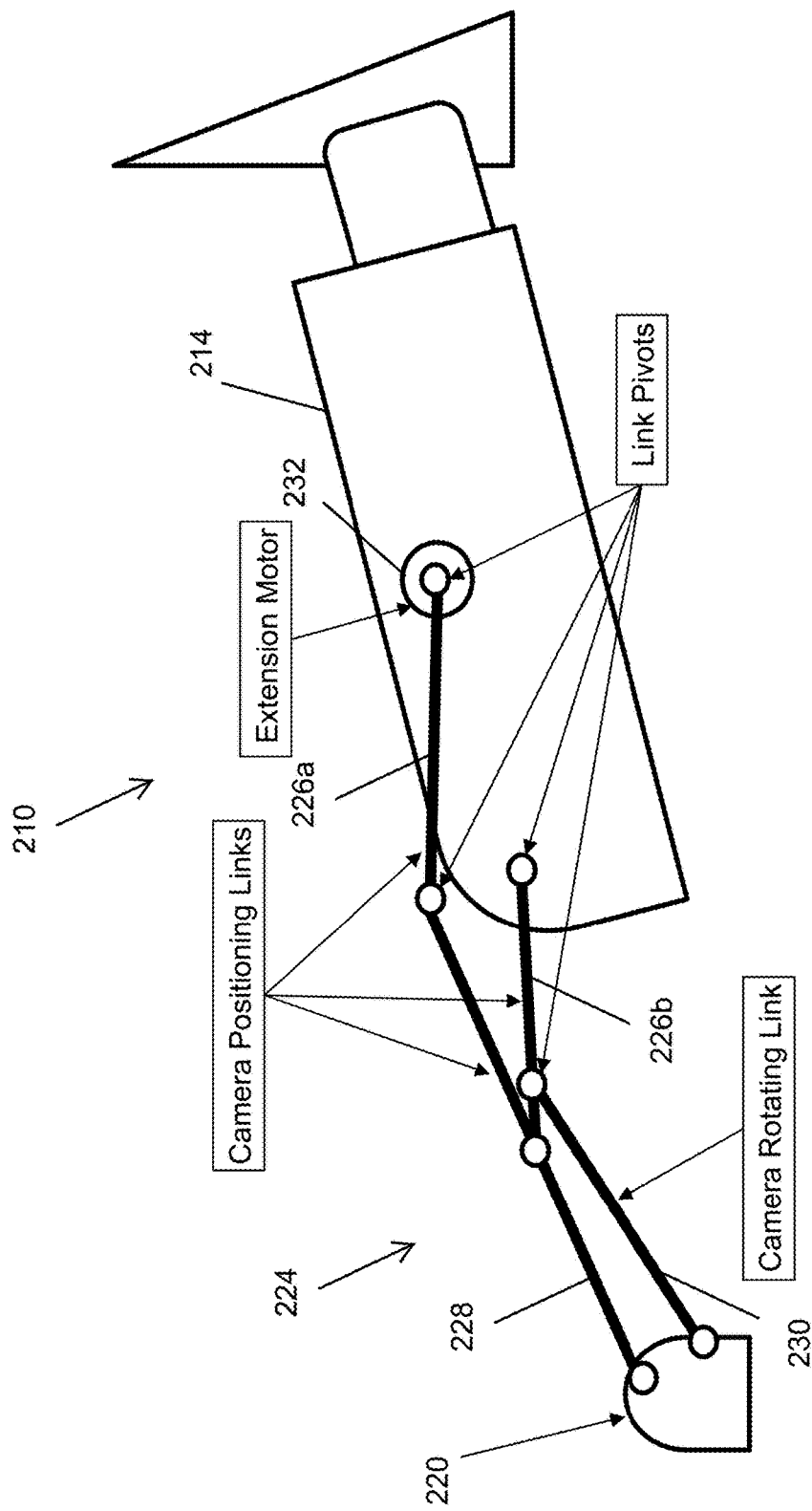
FIG. 14 is a schematic showing positioning links that extend and retract the camera and that pivot the camera in accordance with the present invention.

The mechanism that moves the camera between the retracted and extended positions may be designed such that the camera is rotated between these two optimal positions as it is translated from one position to the other, such as discussed below with respect to FIGS. 14-16.

The camera module may be extended and pivoted via any suitable extension/pivoting means, such as an extendable retractable arm and a pivoting motor or the like. Optionally, and with reference to FIGS. 14-16, a mirror assembly 210 may have a camera module 220 that is extendable and retractable and pivotable relative to the mirror casing 214 via an extension/retraction mechanism or linkage system 224. The linkage system 224 includes a plurality of linkages that are pivotally mounted at the mirror head or casing and/or at one another and/or at the camera module. For example, the linkage system may include two positioning links or arms 226a, 226b that pivotally mount at the mirror head and that pivotally connect or attach to respective locations along a third positioning link or arm 228, which pivotally attaches at the camera module 220. A camera rotating or pivoting link 230 is pivotally mounted at one end to the positioning link 226b (between where the positioning link 226b attaches to positioning link 228 and where the positioning link 226b attaches at the mirror head) and at the other end at the camera module 220. Thus, when a motor 232 is actuated to rotate positioning link 226a about its pivot axis at the mirror head, the linkages 226a, 226b, 228 and 230 pivot to extend or retract the camera module relative to the mirror casing while simultaneously and correspondingly pivoting or rotating the camera about a generally vertical axis to adjust the camera's principal axis of its field of view relative to the side of the vehicle at which the mirror assembly is mounted.

Thus, and as best shown with reference to FIGS. 15 and 16, the linkages 226a, 226b, 228 and 230 may be pivoted or adjusted to be substantially along a rear portion of the mirror head or casing (although shown as being outside of the mirror casing in FIG. 15, this is for clarity purposes and it is envisioned that the linkages would nest inside the mirror casing when in the retracted position of FIG. 15). When the extension motor is actuated to extend the camera (such as responsive to a user input or a trailer towing determination or the like), the linkages pivot to extend the camera generally laterally outboard from the outboard end of the mirror casing while also rotating the camera about a generally vertical pivot axis or axes (such as shown in FIG. 16). Thus, when retracted (FIG. 15), the principal axis of the camera's field of view is generally rearward and outboard away from the side of the vehicle so as to encompass the blind spot region at the side and rearward of the equipped vehicle, and when extended (FIG. 16), the principal axis of the camera's field of view is generally rearward along the side of the vehicle so as to encompass a more rearward region at the side and rearward of a trailer being towed by the equipped vehicle.

While the camera is in the extended position, it may be difficult for pedestrians or other motorists to see due to its relatively small size. To aid in seeing the camera in the extended position, the camera or extension arm may include a clearance lamp or marker light. Modern LED technology allows such a light to be added to the camera module without adding excessive weight or requiring a lot more structure in the extension mechanism. For example, one or more LEDs may be included at the camera housing and may be activated (at either a constant state or flashing state) when the camera is extended from the mirror assembly.

For the convenience of the driver, the mechanism that extends and retracts the camera may be powered by a motor that is controlled by a switch inside the vehicle. As with many mechanisms which move between two different positions, care needs to be taken that the motor or gear mechanism is not damaged when reaching the end of travel. If the motor stalls, it may overheat and become damaged, or the excessive torque generated could cause gear damage. Therefore, it is desirable that means are provided to shut off the motor or prevent it from stalling. This may be accomplished using limit switches or sensors, motor over-current sensing and prevention, clutches, detents, or the like. For example, the extension/retraction mechanism and motor may utilize aspects of the drive systems described in U.S. Publication Nos. US-2015-0360615; US-2014-0376119; US-2014-0133044 and/or US-2013-0107386, which are hereby incorporated herein by reference in their entireties.

If for any reason the motor that extends and retracts the camera is not working, perhaps due to a failed motor or drive mechanism, or a blown fuse, the drive should still have the ability to manually extend or retract the camera until the motor can be fixed or replaced. Such a manual override function of the positioning mechanism may be accomplished using clutches, detents, or even a manually operated release mechanism that disconnects the extending and retracting mechanism from the drive mechanism. Alternatively, the drive mechanism may be designed to be back-driven when sufficient force is manually applied.

Optionally, the camera may be extended and retracted by stepper motor control. The camera may be used for trailer towing conditions or other driving conditions. The camera may extend/retract responsive to a user input, whereby the driver can choose to extend the camera at any time that he or she wants to view displayed images derived from image data captured by the extended camera.

To prevent damage to the camera and/or the camera extension arm and/or surrounding obstacles, the arm may be designed such that it can pivot forward or rearward (and/or upward or downward) upon impact, similar to fold-away or break-away exterior rear view mirrors. For example, the camera may impact the side of a garage door opening, a utility pole, or even another vehicle. Preventing damage to the camera or the impacted obstacle or to the mirror assembly may be accomplished using a pivot with a detent or clutch, with a break-away linkage that can easily be re-attached, or even by back-driving the drive mechanism. Alternatively, the camera extension arm may be designed to be robust enough to cause the entire rear-view mirror head to fold away upon impact.

Optionally, the camera and/or extension arm can be detached from the mirror housing without removing the mirror from the vehicle, to ease replacement of camera. The camera thus may be readily detached from the extension arm and replaced, or the camera and extension arm may be readily detached from the mirror assembly and replaced. For example, the camera may be snapped in and out from the end of the extension arm for replacement, such as by a service technician.

Although described at being disposed at and extendable from an exterior rearview mirror assembly, the extendable/retractable/adjustable camera of the present invention can be used elsewhere at the vehicle. For example, the camera may extend from another element, such as from the vehicle door handle or a side portion of vehicle. Because a vehicle door handle (or other element) may not have the depth to receive a laterally extending arm when the arm is retracted, the extendable/retractable arm or mechanism of the camera may flip out from the door handle or element (where the arm is disposed along a portion of the door handle or element when retracted and pivots or swings or flips outward, such as about a generally vertical pivot axis, when extended) or may telescopingly extend/retract at the door handle, in order to provide the desired extension without requiring the same amount of depth in the handle or element for the retracted arm and camera.

Optionally, the camera, when extended, can be user manipulated or controlled to adjust the field of view of the camera. For example, the camera (such as when extended) may be adjusted by the driver of the vehicle (such as via a joystick or other user input button or toggle in the vehicle) to provide a desired field of view and displayed images, such as for a spotlight camera (where the camera's field of view is adjusted to encompass a region illuminated by a spotlight of the mirror, such as a spotlight as described in U.S. Pat. No. 8,764,256, which is hereby incorporated herein by reference in its entirety). The camera thus may be manually adjusted or rotated or pivoted to change its field of view to encompass regions rearward of the vehicle, sideward of the vehicle and forward of the vehicle and the like.

Optionally, and desirably, the camera has a wide angle or fisheye field of view, whereby processing of captured image data by an image processor may be used to achieve the desired displayed images.

The display device that displays images derived from image data captured by the camera or cameras of the exterior rearview mirror assembly or assemblies may be any suitable display that is operable to display video images viewable by the driver of the vehicle while normally operating the vehicle. For example, the display device or video display screen may be disposed at a console of the vehicle or at the interior rearview mirror assembly of the vehicle or at a door-mounted console or display device, such that the driver may readily view the displayed video images while driving the vehicle.

Figure 17:
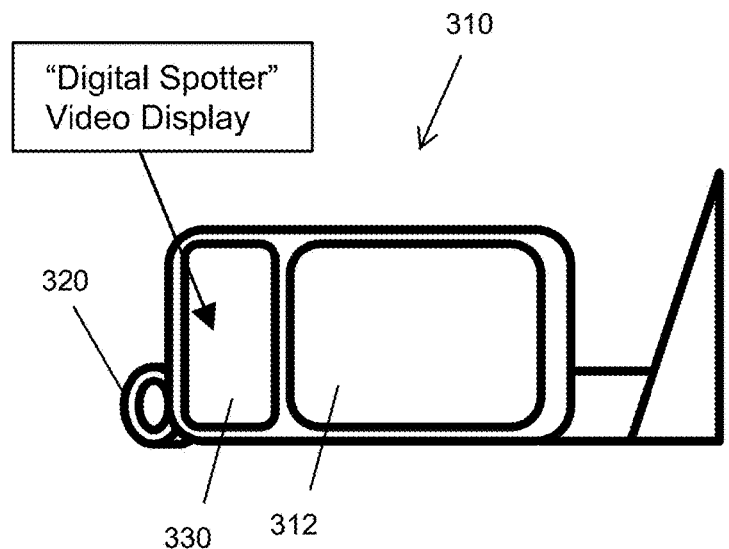
FIG. 17 is a forward viewing elevation of another exterior rearview mirror assembly of the present invention, shown with the camera retracted and a video display screen disposed outboard of the mirror reflective element.
Figure 18:
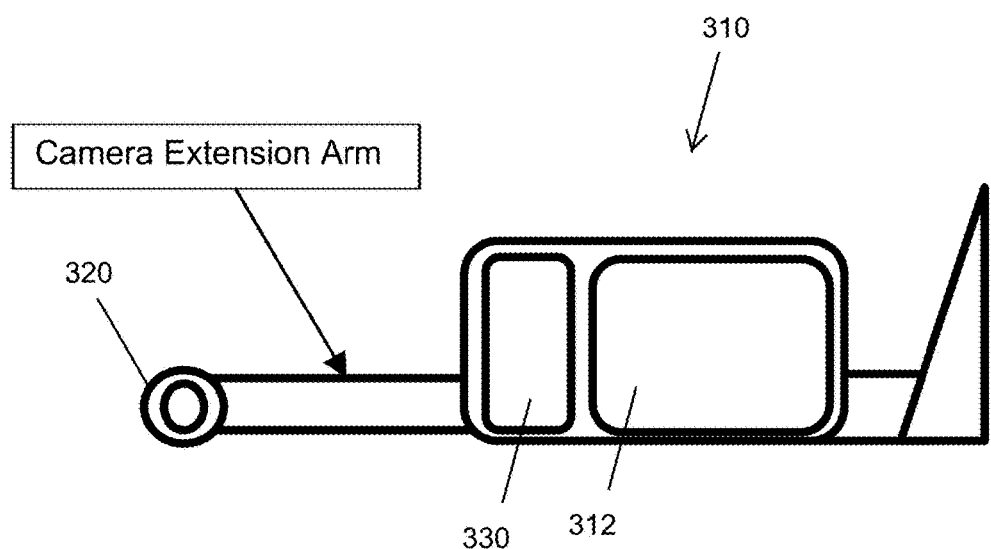
FIG. 18 is a forward viewing elevation of the exterior rearview mirror assembly of FIG. 17, shown with the camera extended.
Figure 19:
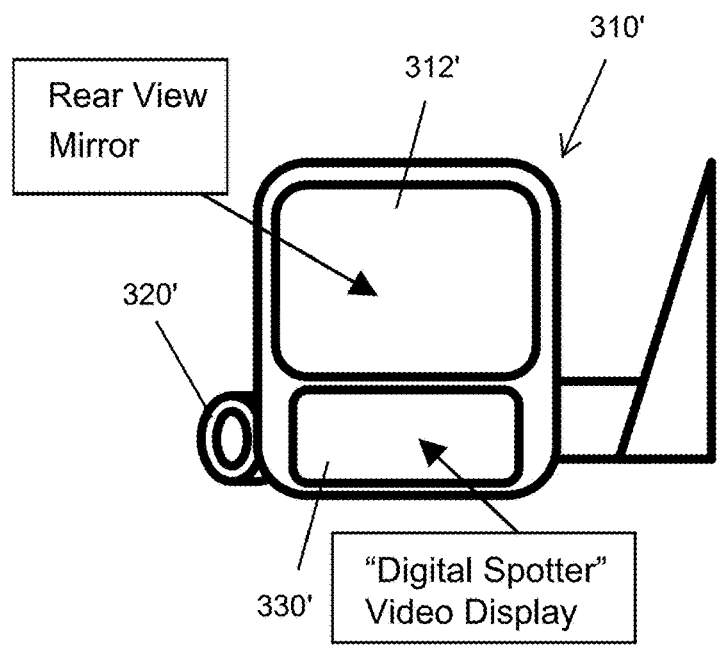
FIG. 19 is a forward viewing elevation of another exterior rearview mirror assembly of the present invention, shown with the camera retracted and a video display screen disposed below the mirror reflective element.
Figure 20:
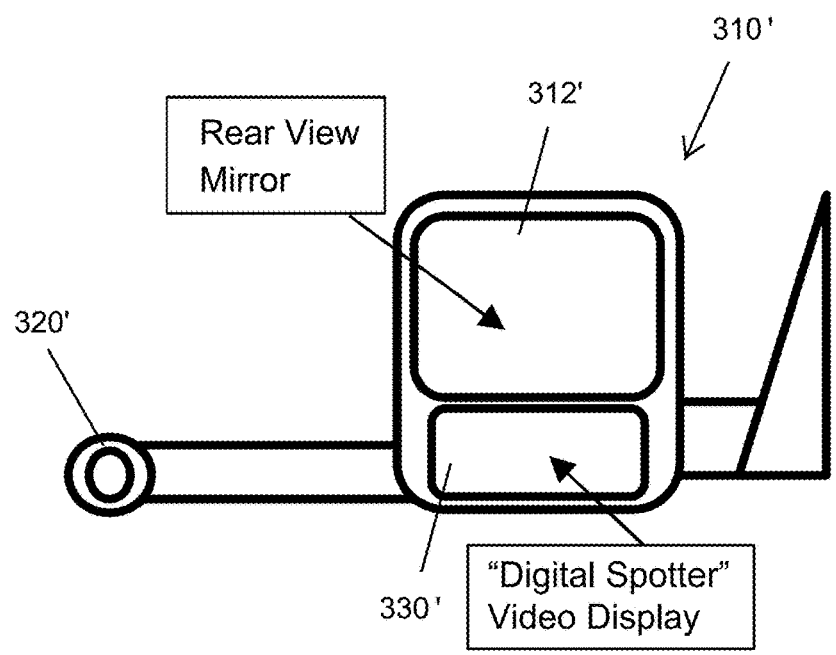
FIG. 20 is a forward viewing elevation of the exterior rearview mirror assembly of FIG. 19, shown with the camera extended.

Optionally, the display device may be disposed at the exterior rearview mirror assembly such that the driver can readily view the displayed images and readily understand the meaning of the displayed images. For example, and such as shown in FIGS. 17 and 18, an exterior rearview mirror assembly 310 includes a rear view mirror reflective element 312 and a video display screen 330 disposed outboard of the mirror reflective element and operable to display video images derived from image data captured by a camera 320 of the mirror assembly 310. Optionally, for example, and such as shown in FIGS. 19 and 20, an exterior rearview mirror assembly 310' includes a rear view mirror reflective element 312' and a video display screen 330' disposed below the mirror reflective element and operable to display video images derived from image data captured by a camera 320' of the mirror assembly 310'.

The camera may comprise any suitable camera, and may be fixedly mounted at the mirror assembly or may be extendable and retractable relative to the mirror assembly, such as by utilizing aspects of the extension/retraction mechanisms discussed above. Optionally, the digital spotter video display 330, 330' may be automatically actuated to display captured images responsive to extension of the camera (FIG. 18). Optionally, the video display 330, 330' may be selectively actuated or deactuated, such as responsive to a user input actuated by the driver of the vehicle or such as responsive to a blind spot detection system, whereby the video display may be actuated when another vehicle is determined to be in the blind spot of the equipped vehicle (and such as also responsive to actuation of turn signal indicator of the equipped vehicle or other indication that the driver of the equipped vehicle may change lanes into the lane occupied by the determined other vehicle).

Thus, a display is provided at which streaming video can be shown from a fixedly mounted or extendable mounted camera at the exterior rearview mirror assemblies. The display is disposed at the exterior rearview mirror assembly and at or near the exterior mirror reflective element. This location offers an intuitive position for rearward vision checks for lane changes and monitoring the blind spot as opposed to showing the camera image on a display in the interior of the vehicle.

The display can be mounted adjacent to a primary view rearview mirror reflective element in either a vertical or horizontal orientation on either side (inboard/outboard or top/bottom). The display may be fixedly attached at the mirror head assembly (such as fixed relative to the mirror casing) or may be attached at the mirror reflective element holder (and thus adjustable with the mirror reflective element when the reflective element is adjusted to adjust the viewing angle). Optionally, the display may be mounted behind the mirror reflective element as a display on demand type of display that is viewable through a transflective (partially transmissive and partially reflective) mirror reflector of the mirror reflective element or may be mounted behind an etched/clear or non-reflective window of the mirror reflective element so as to be viewable through the window of the mirror reflector of the mirror reflective element. If attached at the mirror head assembly, the bezel can provide a visor to reduce direct light reflections and glare from the display surface as well as minimize off angle viewing of the display to other drivers.

Optionally, the display may have directional film or films to direct the displayed images towards the driver so as to optimize the viewing angle of the driver. Optionally, for exterior robustness against impacts, abrasions and/or the like, the display may be attached at a clear front glass element or substrate (either mechanically or optically bonded with adhesive), so that the display screen itself is not exposed to the elements at the exterior rearview mirror assembly.

Therefore, the present invention provides an extendable and retractable camera at an exterior rearview mirror assembly of a vehicle, with the camera being extendable for trailer towing applications so that the camera is disposed farther out from the side of the vehicle to provide enhanced viewing along a side of a trailer being towed by the vehicle (with the trailer possibly being wider than the vehicle). When the camera is extended, the camera is also pivoted to direct its field of view more rearward to provide enhanced viewing along the side of the vehicle and towed trailer. The extension/retraction mechanism or system may be operated in response to a user input or may automatically extend/retract/pivot the camera responsive to a triggering event, such as when the mirror is extended or pivoted or when it is determined that the vehicle is towing a trailer or the like. The pivoting of the camera is done in conjunction with the extension/retraction (such as via the pivoting linkages or the like), but may be done via a separate pivoting function (such as via a motor that pivots the camera relative to an extension/retraction arm that moves the camera inward and outward relative to the mirror head, with the pivot motor being operable independently of the extension/retraction motor), while remaining within the spirit and scope of the present invention.

Optionally, an exterior rearview mirror assembly of the present invention may include a spotter mirror element to provide a wide angle rearward field of view to the driver of the vehicle equipped with the mirror assembly. The spotter mirror element may utilize aspects of the mirrors described in U.S. Pat. Nos. 7,255,451; 7,195,381; 6,717,712; 7,126,456; 6,315,419; 7,097,312; 6,522,451; 6,315,419; 5,080,492; 5,050,977; 5,033,835; 8,021,005; 7,934,844; 7,887,204; 7,824,045 and/or 7,748,856, which are hereby incorporated herein by reference in their entireties.

Optionally, the exterior mirror element of a mirror assembly may include heater pad or film or element at a rear surface of the mirror reflective element. The heater pad or element at the rear surface of the glass substrate may comprise a mirror defrost/demisting heater and may provide an anti-fogging or de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Publication Nos. US-2008-0011733 and/or US-2011-0286096, which are hereby incorporated herein by reference in their entireties.

Optionally, the mirror assembly may include a blind spot indicator and/or a turn signal indicator, such as an indicator or indicators of the types described in U.S. Pat. Nos. 6,198,409; 5,929,786 and/or 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or International Publication No. WO 2006/124682, which are hereby incorporated herein by reference in their entireties.

Such an indicator or indicators may function as a lane change assist (LCA) indicator or indicators and/or a blind spot indicator or indicators. Such blind spot indicators are typically activated when an object is detected (via a side object or blind spot detection system or the like such as described in U.S. Pat. Nos. 7,038,577; 6,882,287; 6,198,409; 5,929,786; 5,786,772 and/or 7,720,580, and/or International Publication No. WO 2007/005942, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane. Optionally, and alternately, the indicator or indicators may function as a lane change assist indicator or indicators, where the host vehicle may be detected to be moving into an adjacent lane without the turn signal being activated, and an object or vehicle may be detected at the adjacent lane, whereby the LCA indicator or indicators may be activated to provide an alert to the driver of the lane change to assist the driver in avoiding unintentional lane changes and/or lane changes when a vehicle or object is detected in the adjacent lane.

The blind spot indicators thus may be operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or an ultrasonic sensor or sensors, or a sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; 5,786,772; 7,881,496 and/or 7,720,580, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 6,757,109 and/or 7,005,974, and/or of the automatic headlamp controls described in U.S. Pat. Nos. 5,796,094; 5,715,093 and/or 7,526,103, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and/or 5,796,094, and/or International Publication No. WO 2004/047421, with all of the above referenced U.S. patents and PCT publications being commonly assigned and being hereby incorporated herein by reference in their entireties.

The reflective element of the rearview mirror assembly of vehicles may include an auxiliary wide angle or spotter mirror portion, such as the types described in U.S. Pat. Nos. 7,255,451; 7,195,381; 6,717,712; 7,126,456; 6,315,419; 7,097,312; 6,522,451; 6,315,419; 5,080,492; 5,050,977 and/ or 5,033,835, which are hereby incorporated herein by reference in their entireties, and optionally may have an integrally formed auxiliary mirror reflector, such as the types described in U.S. Pat. Nos. 8,917,437; 8,736,940; 8,021,005; 7,934,844; 7,887,204; 7,824,045 and 7,748,856, which are hereby incorporated herein by reference in their entireties.

The mirror assembly may comprise any suitable construction, such as, for example, a mirror assembly with the reflective element being nested in the mirror casing and with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/ or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064, WO 2011/044312, WO 2012/051500, WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/ or 7,184,190, and/or in U.S. Pat. Pub. Nos. US-2006-0061008 and/or US-2006-0050018, which are all hereby incorporated herein by reference in their entireties.

The imaging sensor (such as a sideward and/or rearward facing imaging sensor or camera that has a sideward/ rearward field of view at the side of the vehicle at which the exterior mirror assembly is mounted) may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; 7,720,580 and/or 8,786,704, which are all hereby incorporated herein by reference in their entireties. Optionally, for example, the vehicle vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/ 075250; WO 2013/019795; WO 2012-075250; WO 2012/ 154919; WO 2012/0116043; WO 2012/0145501; WO 2012/ 0145313; WO 2012/145822; WO 2013/081985; WO 2013/ 086249 and/or WO 2013/109869, and/or U.S. Publication No. US-2012-0162427, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A exterior rearview mirror assembly for a vehicle, said exterior rearview mirror assembly comprising:
a mirror head and a mounting base;
wherein said mirror head comprises a mirror casing and a reflective element;
wherein said mounting base is configured for attachment of said exterior rearview mirror assembly at a body side of an equipped vehicle;
a camera module disposed at said mirror head;
said camera module comprising a camera having a field of view exterior of the equipped vehicle when said exterior rearview mirror assembly is attached at the equipped vehicle;
said camera operable to capture image data;
wherein said camera module is extendable and retractable relative to said mirror casing;
wherein, with said camera module retracted and with said exterior rearview mirror assembly attached at the equipped vehicle, said camera module is oriented such that the field of view of said camera encompasses a blind spot region at least at the body side of the equipped vehicle;
wherein, with said camera module extended and with said exterior rearview mirror assembly attached at the equipped vehicle, said camera module is oriented such that the field of view of said camera encompasses a region at least along a body side of a trailer being towed by the equipped vehicle;
wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle; and
wherein the horizontal field of view of said camera is in accordance with the following formula:

$$\alpha = \frac{\tan^{-1}\left(\frac{W}{d}\right)}{M}$$

where $\alpha$ is the horizontal field of view of said camera (degrees), W is the width of said display screen (meters), d is the distance between said display screen and the driver's eyes (meters), and M is the magnification (unitless).

2. A exterior rearview mirror assembly for a vehicle, said exterior rearview mirror assembly comprising:
a mirror head and a mounting base;
wherein said mirror head comprises a mirror casing and a reflective element;
wherein said mounting base is configured for attachment of said exterior rearview mirror assembly at a body side of an equipped vehicle;
a camera module disposed at said mirror head;
said camera module comprising a camera having a field of view exterior of the equipped vehicle when said exterior rearview mirror assembly is attached at the equipped vehicle;
said camera operable to capture image data;
wherein said camera module is extendable and retractable relative to said mirror casing;
wherein, with said camera module retracted and with said exterior rearview mirror assembly attached at the equipped vehicle, said camera module is oriented such that the field of view of said camera encompasses a blind spot region at least at the body side of the equipped vehicle;
wherein, with said camera module extended and with said exterior rearview mirror assembly attached at the equipped vehicle, said camera module is oriented such that the field of view of said camera encompasses a region at least along a body side of a trailer being towed by the equipped vehicle; and
wherein said camera module is extendable and retractable via a mechanism that extends and retracts said camera module and that pivots said camera module about a vertical pivot axis.

3. The exterior rearview mirror assembly of claim 2, wherein, with said camera module retracted and with said exterior rearview mirror assembly attached at the equipped vehicle, the field of view of said camera partially overlaps a field of view provided by the reflective element of said exterior rearview mirror assembly.

4. The exterior rearview mirror assembly of claim 2, wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle.

5. The exterior rearview mirror assembly of claim 4, wherein the field of view of said camera is determined by at least one of (a) the width of said display screen, (b) the distance between said display screen and the driver's eyes, and (c) the amount of magnification allowed in video images displayed by said display screen.

6. The exterior rearview mirror assembly of claim 2, wherein the field of view of said camera comprises a principal axis, and wherein the principal axis of the field of view of said camera is directed at least partially outwardly away from the body side of the equipped vehicle when said camera module is retracted and with said exterior rearview mirror assembly attached at the equipped vehicle.

7. The exterior rearview mirror assembly of claim 6, wherein the principal axis of the rearward field of view of said camera is directed at least partially rearward along the body side of the equipped vehicle when said camera module is extended and with said exterior rearview mirror assembly attached at the equipped vehicle.

8. The exterior rearview mirror assembly of claim 2, wherein the field of view of said camera is between a minimum of 9 degrees and a maximum of 90 degrees.

9. The exterior rearview mirror assembly of claim 2, wherein, with said camera module extended and with said exterior rearview mirror assembly attached at the equipped vehicle, said camera is oriented inward toward the equipped vehicle so that the trailer at least partially occludes the field of view of said camera.

10. The exterior rearview mirror assembly of claim 2, wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle, and wherein, with said camera module extended and with said exterior rearview mirror assembly attached at the equipped vehicle, the driver viewing said display screen sees the body side of the trailer being towed.

11. The exterior rearview mirror assembly of claim 2, wherein extension and retraction of said camera module is motorized.

12. The exterior rearview mirror assembly of claim 2, wherein extension and retraction of said camera module is powered by a motor that is controlled by a switch inside the equipped vehicle that is operable by a driver of the equipped vehicle when said exterior rearview mirror assembly is attached at the equipped vehicle.

13. A exterior rearview mirror assembly for a vehicle, said exterior rearview mirror assembly comprising:
   a mirror head and a mounting base;
   wherein said mirror head comprises a mirror casing and a reflective element;
   wherein said mounting base is configured for attachment of said exterior rearview mirror assembly at a body side of an equipped vehicle;
   a camera module disposed at said mirror head;
   said camera module comprising a camera having a field of view exterior of the equipped vehicle when said exterior rearview mirror assembly is attached at the equipped vehicle;
   said camera operable to capture image data;
   wherein said camera module is extendable and retractable relative to said mirror casing;
   wherein, with said camera module retracted and with said exterior rearview mirror assembly attached at the equipped vehicle, said camera module is oriented such that the field of view of said camera encompasses a blind spot region at least at the body side of the equipped vehicle;
   wherein, with said camera module extended and with said exterior rearview mirror assembly attached at the equipped vehicle, said camera module is oriented such that the field of view of said camera encompasses a region at least along a body side of a trailer being towed by the equipped vehicle; and
   wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle, and wherein display by said display screen of video images derived from image data captured by said camera is automatically actuated responsive to a blind spot detection system of the equipped vehicle determining another vehicle to be in a blind spot of the equipped vehicle.

14. The exterior rearview mirror assembly of claim 13, wherein said display screen is disposed at said exterior rearview mirror assembly.

15. An exterior rearview mirror assembly for a vehicle, said exterior rearview mirror assembly comprising:
   a mirror head and a mounting base;
   wherein said mirror head comprises a mirror casing and a reflective element;
   wherein said mounting base is configured for attachment of said exterior rearview mirror assembly at a body side of an equipped vehicle;
   a camera module disposed at said mirror head;
   said camera module comprising a camera having a field of view exterior of the equipped vehicle when said exterior rearview mirror assembly is attached at the equipped vehicle;
   said camera operable to capture image data;
   wherein said camera module is extendable and retractable relative to said mirror casing;
   wherein, with said camera module retracted and with said exterior rearview mirror assembly attached at the equipped vehicle, said camera module is oriented such that the field of view of said camera encompasses a blind spot region at least at the body side of the equipped vehicle;
   wherein, with said camera module retracted and with said exterior rearview mirror assembly attached at the equipped vehicle, the field of view of said camera partially overlaps a field of view provided by the reflective element of said exterior rearview mirror assembly;
   wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle; and
   wherein said camera module is extendable and retractable via a mechanism that extends and retracts said camera module and that pivots said camera module about a vertical pivot axis.

16. The exterior rearview mirror assembly of claim 15, wherein the field of view of said camera is between a minimum of 9 degrees and a maximum of 90 degrees.

17. The exterior rearview mirror assembly of claim 16, wherein the field of view of said camera is determined by the amount of magnification allowed in video images displayed by said display screen.

18. The exterior rearview mirror assembly of claim 15, wherein the field of view of said camera comprises a principal axis, and wherein the principal axis of the field of view of said camera is directed at least partially outwardly away from the body side of the equipped vehicle when said camera module is retracted and with said exterior rearview mirror assembly attached at the equipped vehicle, and wherein the principal axis of the rearward field of view of said camera is directed at least partially rearward along the body side of the equipped vehicle when said camera module is extended and with said exterior rearview mirror assembly attached at the equipped vehicle.

19. The exterior rearview mirror assembly of claim 18, wherein, with said camera module extended and with said exterior rearview mirror assembly attached at the equipped vehicle, said camera module is oriented such that the field of view of said camera encompasses a region at least along a body side of a trailer being towed by the equipped vehicle.

20. An exterior rearview mirror assembly for a vehicle, said exterior rearview mirror assembly comprising:
   a mirror head and a mounting base;
   wherein said mirror head comprises a mirror casing and a reflective element;
   wherein said mounting base is configured for attachment of said exterior rearview mirror assembly at a body side of an equipped vehicle;
   a camera module disposed at said mirror head;

said camera module comprising a camera having a field of view exterior of the equipped vehicle when said exterior rearview mirror assembly is attached at the equipped vehicle;

said camera operable to capture image data;

wherein said camera module is extendable and retractable relative to said mirror casing;

wherein, with said camera module retracted and with said exterior rearview mirror assembly attached at the equipped vehicle, said camera module is oriented such that the field of view of said camera encompasses a blind spot region at least at the body side of the equipped vehicle;

wherein extension and retraction of said camera module is motorized;

wherein the equipped vehicle comprises a display screen viewable by a driver of the equipped vehicle, and wherein said display screen is operable to display video images derived from image data captured by said camera of said camera module when said exterior rearview mirror assembly is attached at the equipped vehicle; and wherein display by said display screen of video images derived from image data captured by said camera is automatically actuated responsive to a blind spot detection system of the equipped vehicle determining another vehicle to be in the blind spot of the equipped vehicle.

21. The exterior rearview mirror assembly of claim 20, wherein the field of view of said camera comprises a principal axis, and wherein the principal axis of the field of view of said camera is directed at least partially outwardly away from the body side of the equipped vehicle when said camera module is retracted and with said exterior rearview mirror assembly attached at the equipped vehicle, and wherein the principal axis of the rearward field of view of said camera is directed at least partially rearward along the body side of the equipped vehicle when said camera module is extended and with said exterior rearview mirror assembly attached at the equipped vehicle.

22. The exterior rearview mirror assembly of claim 20, wherein, with said camera module extended and with said exterior rearview mirror assembly attached at the equipped vehicle, said camera module is oriented such that the field of view of said camera encompasses a region at least along a body side of a trailer being towed by the equipped vehicle.

23. The exterior rearview mirror assembly of claim 20, wherein, with said camera module retracted and with said exterior rearview mirror assembly attached at the equipped vehicle, the field of view of said camera partially overlaps a field of view provided by the reflective element of said exterior rearview mirror assembly, and wherein the field of view of said camera is between a minimum of 9 degrees and a maximum of 90 degrees.

* * * * *